United States Patent
Pauly et al.

(10) Patent No.: US 8,214,258 B2
(45) Date of Patent: Jul. 3, 2012

(54) SYSTEMS, METHODS AND COMPUTER PROGRAM PRODUCTS FOR A COMPREHENSIVE ENVIRONMENTAL BENEFIT PROGRAM ASSOCIATED WITH A COMMERCIAL CREDIT CARD

(75) Inventors: Jeffrey Thomas Pauly, Charlotte, NC (US); David James Vogel, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 313 days.

(21) Appl. No.: 12/629,537

(22) Filed: Dec. 2, 2009

(65) Prior Publication Data

US 2010/0145753 A1    Jun. 10, 2010

Related U.S. Application Data

(60) Provisional application No. 61/121,437, filed on Dec. 10, 2008.

(51) Int. Cl.
*G06Q 40/00*    (2012.01)

(52) U.S. Cl. .................. 705/21; 705/26.1; 705/7.11

(58) Field of Classification Search .................. 705/21, 705/26.1, 7.11
See application file for complete search history.

(56) References Cited

FOREIGN PATENT DOCUMENTS

WO    WO 2007079228    * 12/2007

* cited by examiner

*Primary Examiner* — Daniel Felten
(74) *Attorney, Agent, or Firm* — Michael A. Springs; Moore & Van Allen PLLC; Franklin E. Weindruch

(57) ABSTRACT

Systems, methods, and computer program products are provided for a comprehensive environmental benefit program associated with purchases made by a corporate entity and, more specifically, purchases associated with a commercial credit card. According to embodiments herein disclosed, environmental impact data, such as ecological or carbon footprint data may be determined based on the purchases made by a commercial entity using the commercial credit card and, in some embodiments, purchases made through other purchasing channels. In addition, environmental advisory data, such as suggestions for environmental improvements, environmental educational information or the like may be determined based on the purchases. Additionally, environmental rebates, such as carbon offsets may be determined based on the purchases/purchase amounts and customized based on commercial entity preferences.

48 Claims, 5 Drawing Sheets

SYSTEMS, METHODS AND COMPUTER PROGRAM PRODUCTS FOR A COMPREHENSIVE ENVIRONMENTAL BENEFIT PROGRAM ASSOCIATED WITH A COMMERCIAL CREDIT CARD

CLAIM OF PRIORITY UNDER 35 U.S.C. §119

The present Application for Patent claims priority to Provisional Application No. 61/121,437 entitled "Systems, Methods and Computer Program Products for a Comprehensive Environmental Benefit Program Associated With A Commercial Credit Card" filed Dec. 10, 2008, and assigned to the assignees hereof and hereby expressly incorporated by reference herein.

FIELD

In general, embodiments herein disclosed relate to systems, methods, and computer program products for a comprehensive environmental initiative program associated with commercial purchases and, more specifically, a program that includes environmental-impact tracking and reporting of commercial purchases attributed to a financial institution issued credit card.

BACKGROUND

Corporations are rapidly becoming aware of the need to make their businesses more environmentally friendly. It has been said that companies at the forefront of so-called "green initiatives" will see the same significant boost in terms of overall business success that companies at the forefront of the quality improvement revolution experienced in the 1980's.

The ecological footprint is a measure of human demand on the earth's ecosystems. The ecological footprint compares human demand with the Earth's ecological capacity to regenerate. Thus, it represents the amount of biologically productive land and sea area needed to regenerate the resources a human population consumes and to absorb and render harmless the corresponding waste, given prevailing technology and resource management practices.

A carbon footprint is a subset of the overall ecological footprint. The carbon footprint is a measure of the impact that human activities have on the environment in terms of the amount of greenhouse gases produced. These gases are produced by the burning of fossil fuels for our everyday living, for example, heating and electricity. The purpose of the carbon footprint is for individuals, corporations and the like to conceptualize their personal (or organizational) carbon dioxide contribution. A conceptual tool in response to carbon footprints are carbon offsets or the mitigation of carbon emissions through the development of alternative projects such as solar or wind energy or reforestation.

A carbon offset is an emission reduction credit from another organization's project that results in less carbon dioxide or other greenhouse gases in the atmosphere than would otherwise occur. Carbon offsets are typically bought and sold through a number of international brokers, online retailers, and trading platforms. For example, wind energy companies often sell carbon offsets. The wind energy company benefits because the carbon offsets it sells make such projects more economically viable. The buyers of the offsets benefit because they can claim that their purchase resulted in new non-polluting energy, which they can use to mitigate their own greenhouse gas emissions. The buyers may also save money, as it may be less expensive for them to purchase offsets than to eliminate their own emissions. The market for carbon offsets has grown dramatically recently, from approximately $97 million in 2006 to approximately $330 million in 2007, driven in large part by the green boom among United States corporations.

Commercial credit cards have an established history of offering rebates to corporate card holders based on the amount of purchases made with the card. While in most instances the rebate is in the form of a cash reward, certain rebate programs also afford the card holder the alternative of receiving tangible goods or services in lieu of the cash reward. Recently, financial institutions that offer card rebate programs have begun offering rebate options tied to voluntary carbon offsets, whereby the corporations may choose to forego a cash reward for carbon offset rewards. However, while offering carbon offsets as a commercial credit card reward is beneficial in terms of the benefits afforded by such offsets (as discussed above), it does not provide the corporation with a comprehensive program that mirrors the corporation's overall initiatives for improving environmental concerns. While carbon offsets serve to "offset" a corporation's negative impacts on the environment, they do not seek to remedy or provide alternatives to these negative impacts.

Therefore, a need exists to develop a comprehensive environmental initiative program associated with commercial purchases. The desired program should be robust such that it encompasses not only purchases made through a program-implementing entity, such as a card-issuing financial institution, but also any other purchases made by the corporation/commercial entity. The comprehensive nature of the program should not only entail a negative environmental impacting assessment, such as carbon foot-printing and means to offset negative environmental impacting procurements, such as carbon offsets, but should also provide for a positive impact on environmental attributes associated with future purchases. Additionally, the desired program should create environmental awareness amongst not only the corporation and its employees, but also third parties associated with the corporation, such as other entities in the supply chain and family members of employees.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, devices, systems and computer program products are described herein that provide for a comprehensive environmental benefit program associated with purchases made by a corporate entity and, more specifically, purchases associated with a commercial credit card. In this regard, present embodiments of the invention provide for determining environmental impact data, such as ecological or carbon footprint data, associated with purchases made via a commercial credit card and, according to some embodiments, purchases made through channels other than the commercial credit card. In addition, present embodiments of the invention provide for determining environmental advisory data, such as suggestions for environmental improvements or environmental educational data based on the purchases made via a commercial credit card and, according to some embodiments, purchases made through channels other than the commercial credit card. Further, other embodiments of the comprehensive system provide for determination of environmental rebates/rewards, such as carbon offsets or the like, based on the purchases made via the commercial credit card and, moreover, determination of environmental rebates/rewards based on the amount of the purchases.

According to one embodiment of the invention, a method for providing comprehensive environmental data is defined. The method includes receiving first purchasing information associated with purchases made via the commercial credit card. The method also includes determining environmental impact data related to the purchases and determining environmental advisory data based on the purchases. Further, the method includes providing the environmental impact data and the environmental advisory data to the commercial entity.

According to another embodiment, the method may optionally include receiving second purchasing information associated with purchases made via channels other than the commercial credit card. In such embodiments, determining environmental impact data may further optionally include determining environmental impact data based on the purchases made via the commercial credit card and purchases made via channels other than the commercial credit card. Further, in such embodiments, determining environmental advisory data based on the purchases may further optionally include determining environmental advisory data based on the purchases made via the commercial credit card and purchases made via channels other than the commercial credit card.

According to further embodiments of the method, determining environmental impact data may further optionally include determining a carbon footprint for each of the purchases or any other metric or indices that provided for a negative environmental impact indicator for each of the purchases or groupings of the purchases. In still further embodiments of the method, determining environmental advisory data may optionally include determining suggestions for environmental improvement based on the purchases and/or determining environmental education data based on the purchases.

According to still further optional embodiments, the method may include determining an environmental rebate, such as carbon offsets or the like, based on an overall amount of the purchases. In such embodiments, the method may further include customizing the carbon offsets based on at least one of corporate entity offset type preference or corporate entity offset geographical region preference. Further, in such embodiments, determining the environmental rebate may optionally include determining environmental rebates as a portion of an overall rebate based on the commercial entity's choice for portioning the overall rebate between the environmental rebate and a cash rebate. Additionally, the method may optionally include determining carbon offset sponsorship opportunities for the corporate entity based on the overall amount of the purchases.

Another method for providing comprehensive environmental data to a commercial entity associated with a commercial credit card defines another embodiment of the invention. The method includes receiving first purchasing information associated with purchases made via the commercial credit card and receiving second purchasing information associated with purchases made via channels other than the commercial credit card. The method further includes determining environmental impact data related to the purchases made via the commercial credit card and the purchases made via channels other than the commercial credit card and providing the environmental impact data to the commercial entity.

An apparatus for providing comprehensive environmental data to a commercial entity associated with a commercial credit card defines another embodiment of the present invention. The apparatus includes a computer platform including at least one processor and a memory. The apparatus also includes an environmental commercial card module stored in the memory and executable by the processor, wherein the module is operable to receive first purchasing information associated with purchases made via a commercial credit card. The module includes an environmental impact routine operable to determine environmental impact data related to the purchases and an environmental advisory routine operable to determine environmental advisory data based on the purchases. The module is further operable to store the environmental impact data and the environmental advisory data in the memory.

In an optional embodiment of the apparatus, the environmental commercial card module may be further operable to receive second purchasing information associated with purchases made via channels other than the commercial credit card. In such embodiments, the environmental impact routine may be further operable to determine environmental impact data related to the purchases made via the commercial credit card and purchases made via channels other than the commercial credit card. In still further related optional embodiments of the apparatus, the environmental advisory routine may be further operable to determine environmental advisory data based on the purchases made via the commercial credit card and purchases made via channels other than the commercial credit card.

In other optional embodiments of the apparatus, the environmental impact routine may be further operable to determine a carbon footprint for each of the purchases or any other reactive environmental impact metric or indice for each of the purchases or a grouping of the purchases. Likewise, in other optional embodiments of the apparatus, the environmental advisory routine may be further operable to determine suggestions for environmental improvements based on the purchases, environmental education data or the like.

In still further optional embodiments of the apparatus, the environmental commercial card module may further include an environmental rebate routine operable to determine an environmental rebate, such as carbon offsets or the like, based on an overall amount of the purchases. In such embodiments, the environmental rebate routine may be further operable to determine environmental rebates as a portion of an overall rebate based on the commercial entity's choice for portioning the overall rebate between the environmental rebate and a cash rebate. In such embodiments, the environmental rebate routine may be further operable to customize the carbon offsets based on at least one of corporate entity offset type preference or corporate entity offset geographical region preference. In still further optional embodiments, the environmental rebate routine may be further operable to determine carbon offset sponsorship opportunities for the corporate entity based on the overall amount of the purchases.

Another apparatus for providing comprehensive environmental data to a commercial entity associated with a commercial credit card defines yet another embodiment of the invention. The apparatus includes a computer platform including at least one processor and a memory. The apparatus also includes an environmental benefit module stored in the memory and executable by the processor. The modules is operable to receive first purchasing information associated with purchases made via a commercial credit card and second purchasing information associated with purchases made via channels other than the commercial credit card. The module includes an environmental impact routine operable to determine environmental impact data related to the purchases made via a commercial credit card and purchases made via channels other than the commercial credit card. The module is further operable to store the environmental impact data in the memory.

A computer program product provides for yet another embodiment of the invention. The computer program product includes a computer-readable medium. The medium includes a first set of codes for causing a computer to receive first purchasing information associated with purchases made via the commercial credit card. The medium also includes a second set of codes for causing the computer to determine environmental impact data related to the purchases and a third set of codes for causing the computer to determine environmental advisory data based on the purchases. The medium also includes a fourth set of codes for causing the computer to store the environmental impact data and the environmental advisory data in a file associated with the commercial entity.

According to optional embodiments of the computer program product, the first set of codes may be further operable to cause the computer to receive second purchasing information associated with purchases made via channels other than the commercial credit card. In such embodiments, the second set of codes may be further operable to cause the computer to determine environmental impact data based on the purchases made via the commercial credit card and purchases made via channels other than the commercial credit card. Likewise, the third set of codes may be further operable to cause the computer to determine environmental advisory data based on the purchases made via the commercial credit card and purchases made via channels other than the commercial credit card.

According to certain embodiments of the computer program product, the second set of codes may be further operable to cause the computer to determine a carbon footprint for each of the purchases. In other embodiments of the computer program product, the third set of codes is further operable to cause the computer to determine suggestions for environmental improvement based on the purchases.

In other optional embodiments, the computer program product may include a fifth set of codes to cause the computer to determine an environmental rebate, such as carbon offsets or the like, based on an overall amount of the purchases. In such embodiments, the fifth set of codes may be further operable to cause the computer to customize the carbon offsets based on at least one of corporate entity offset type preference or corporate entity offset geographical region preference. In still further optional embodiments, the fifth set of codes may be further operable to cause the computer to determine environmental rebates as a portion of an overall rebate based on the commercial entity's choice for portioning the overall rebate between the environmental rebate and a cash rebate. In further optional embodiments, the fifth set of codes may be further operable to cause the computer to determine carbon offset sponsorship opportunities for the corporate entity based on the overall amount of the purchases.

Thus, present embodiments herein disclosed provide for a comprehensive environmental benefit program associated with purchases made by a corporate entity and, more specifically, purchases associated with a commercial credit card issued to the corporate entity. The comprehensive environmental benefit program provides for not only rebates/rewards that are environmental-based, such as carbon offsets or the like, but also provides for determining environmental impact data, such as carbon footprint data or the like, associated with each of the purchases and determining environmental advisory data, such as suggestions for environmental improvements, educational information or the like, based on the purchases.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
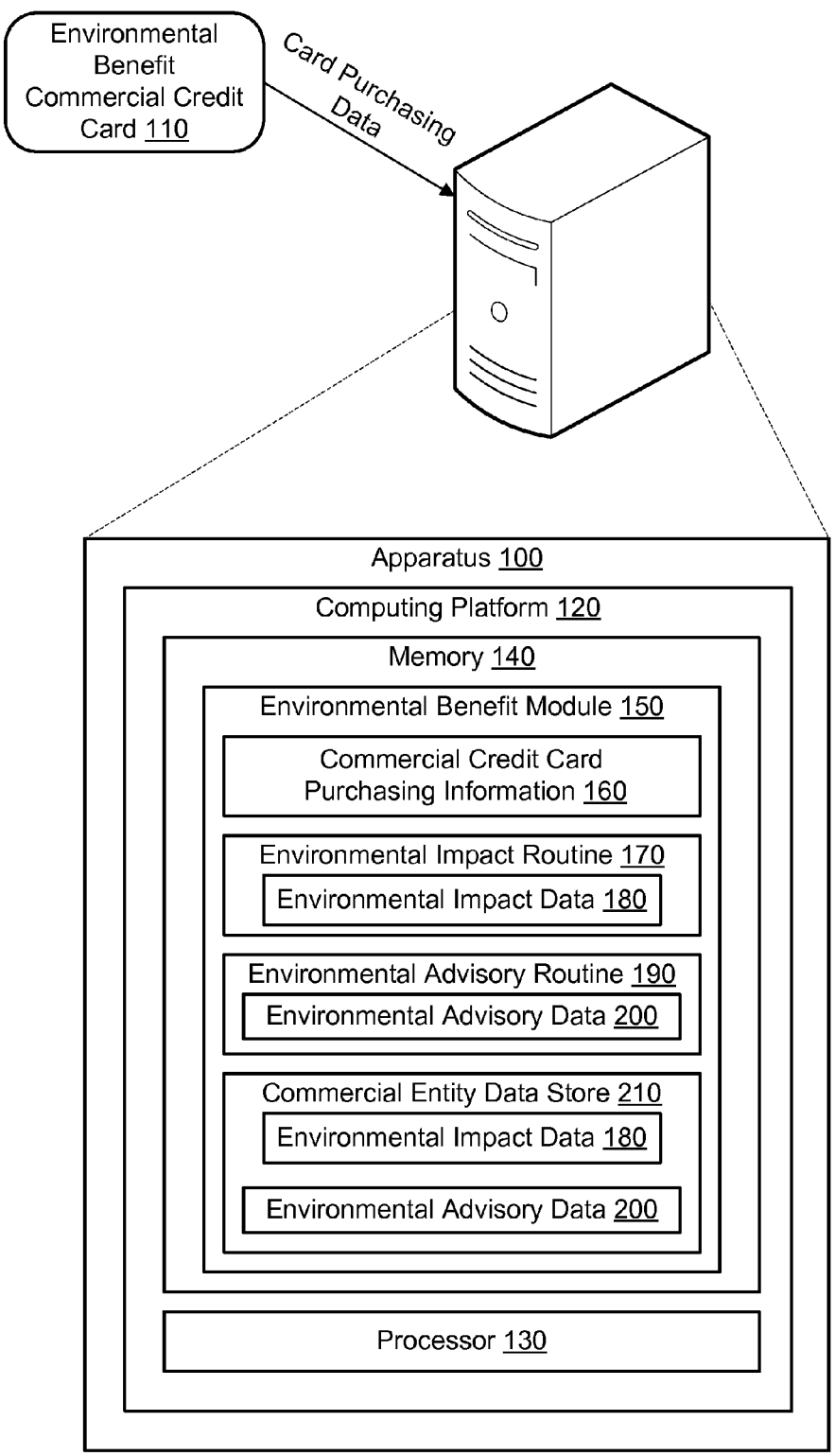
Figure 2:
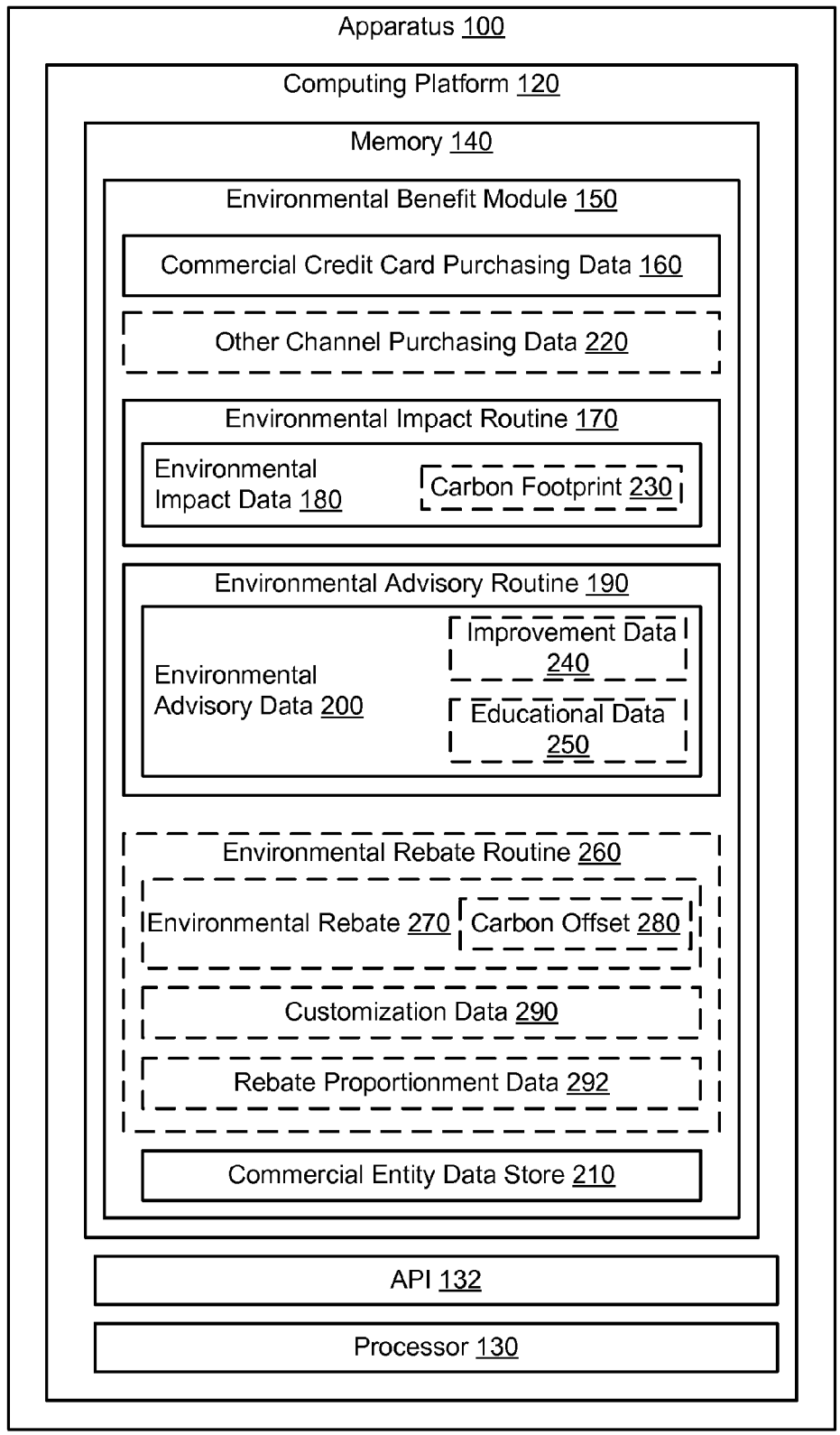
Figure 3:
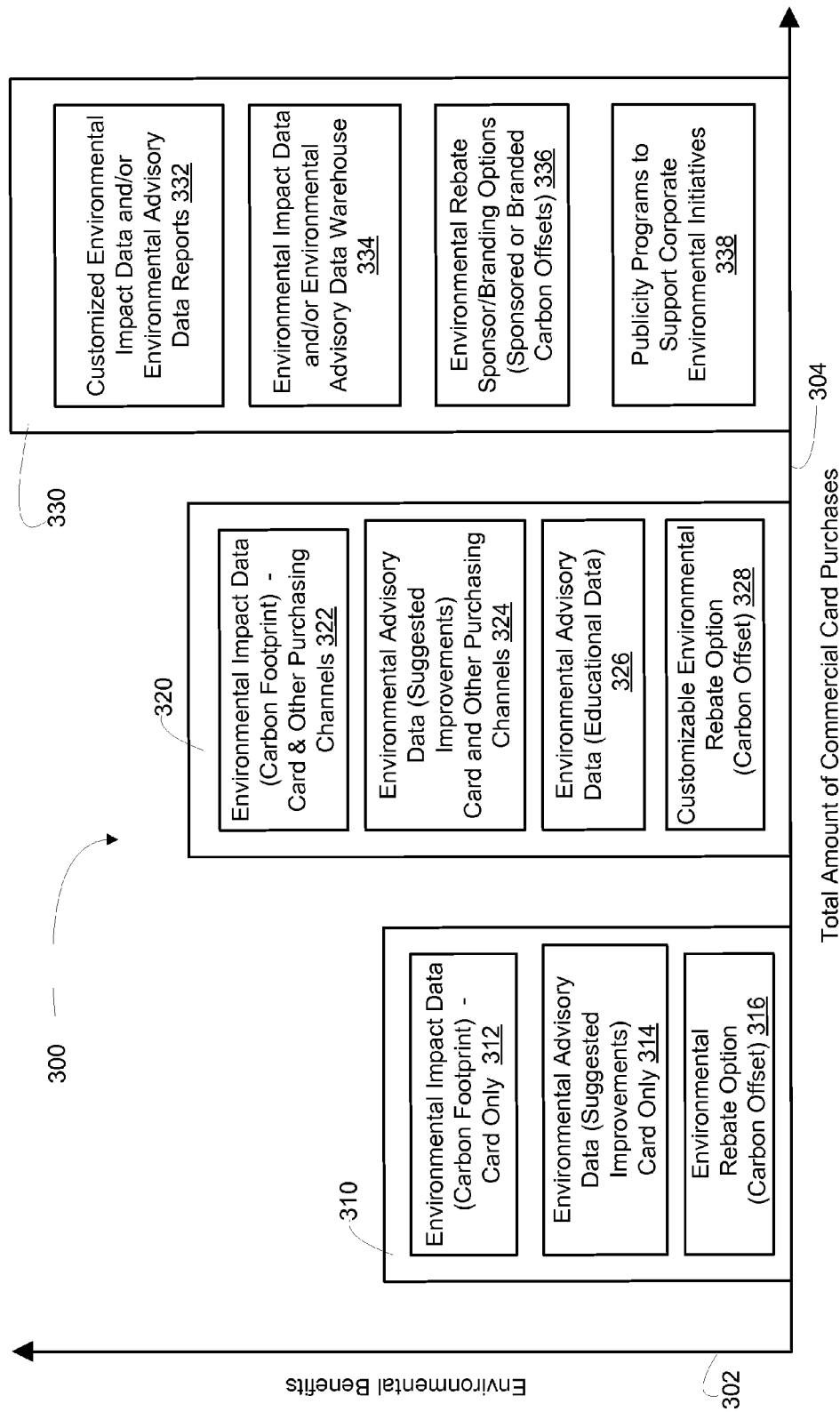
Figure 4:
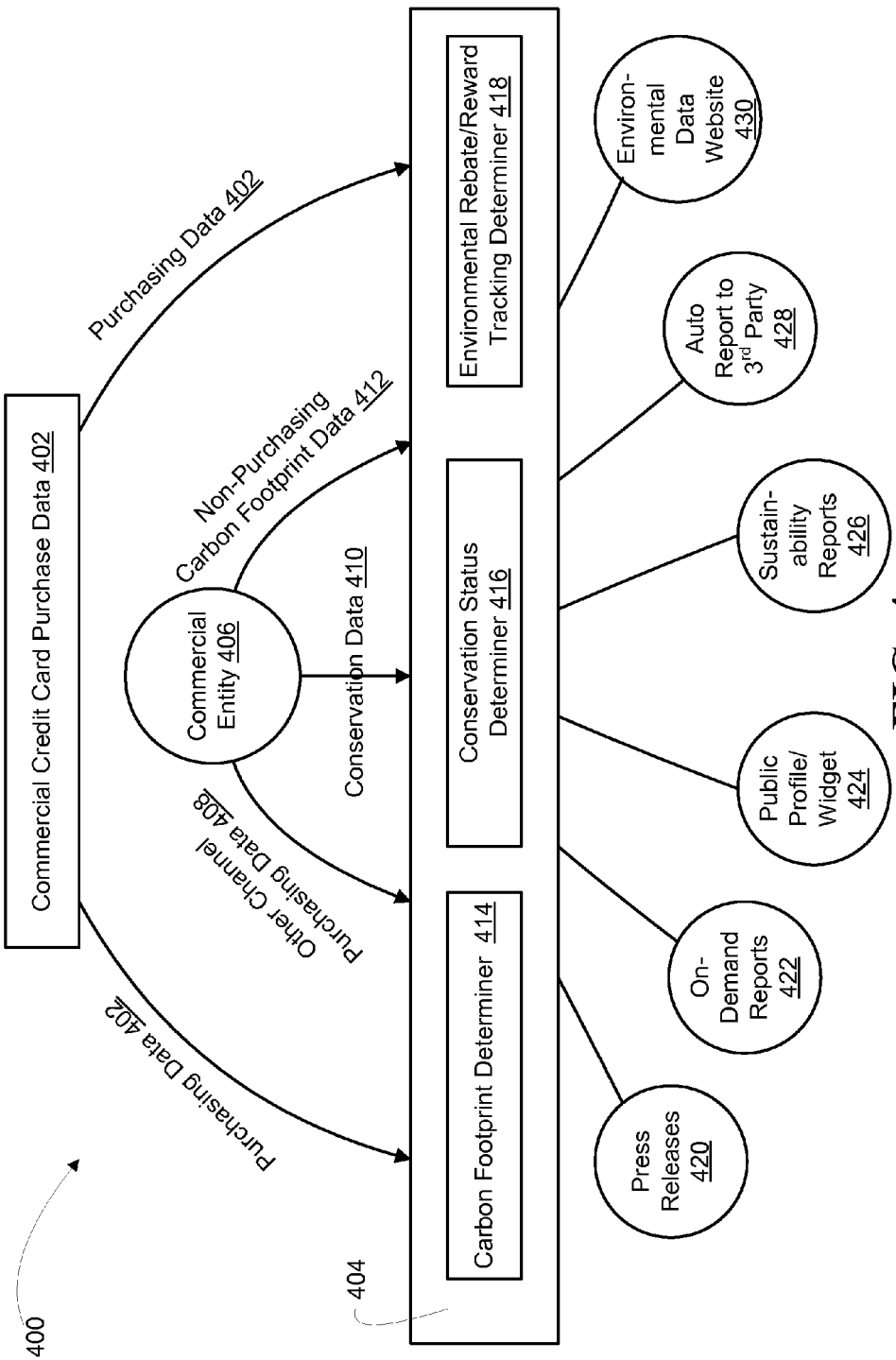
Figure 5:
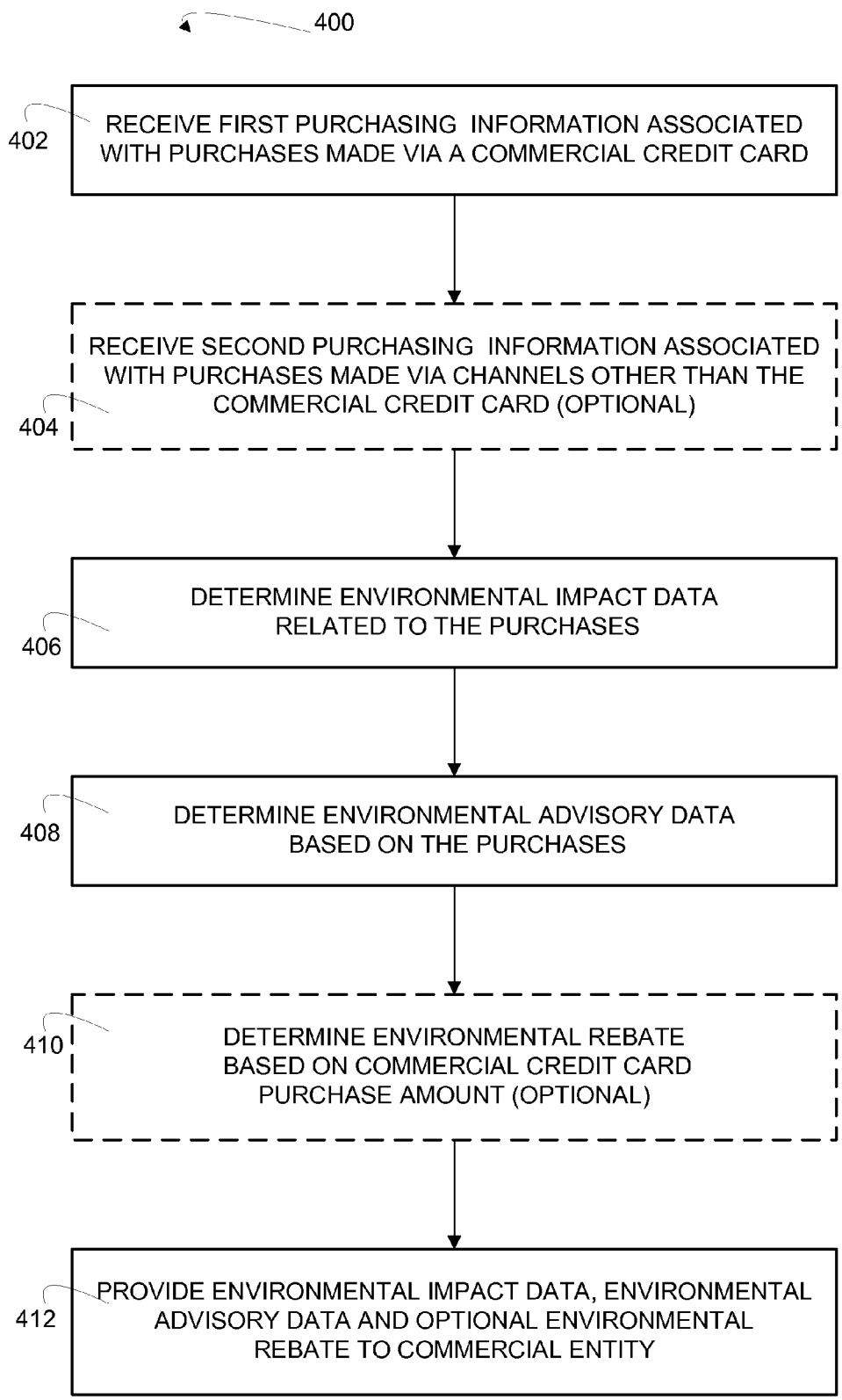

Having thus described embodiments of the invention in general terms, reference will now be made to the accompanying drawings, which are not necessarily drawn to scale, and wherein:

FIG. 1 is a block diagram of an apparatus for providing comprehensive environmental benefits in conjunction with a commercial credit card, in accordance with one embodiment of the present invention;

FIG. 2 is a more detailed block diagram of an apparatus for providing comprehensive environmental benefits in conjunction with a commercial credit card, in accordance with one embodiment of the present invention;

FIG. 3 is a chart of comprehensive environmental benefits shown in relation to commercial credit card purchase amounts, in accordance with an embodiment of the present invention;

FIG. 4 is a block diagram of a system for providing comprehensive environmental benefits in conjunction with a commercial credit card, in accordance with one embodiment of the present invention; and FIG. 5 is a flow diagram of a method for providing comprehensive environmental benefits in conjunction with a commercial credit card, in accordance with another embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident, however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, present embodiments provide for methods, systems, and computer program products that provide for a comprehensive environmental benefit program associated with purchases made by a corporate entity and, more specifically, purchases made with a commercial credit card issued to the corporate entity. The comprehensive environmental benefit program provides for not only environmental-based rebates/rewards, such as carbon offsets or the like, but also provides for determining environmental impact data, such as carbon footprint data or the like, associated with each of the purchases and determining environmental advisory data, such as suggestions for environmental improvements, educational information or the like, based on the purchases.

In certain embodiments, the comprehensive environmental benefit program relies not only on purchasing information related to purchases made with the commercial credit card, but also purchases made through other channels, such as checks, cash payments, other commercial credit card accounts and the like. In this regard, the environmental impact data and environmental advisory data that are determined and provided to the commercial entity is reflective of most, if not all, of the purchases for or on behalf of the commercial entity. By allowing for the purchasing information to be all-encompassing, the environmental impact data and the environmental advisory data provide a more accurate picture of the overall commercial entities' environmental initiatives.

Referring to FIG. 1, a block diagram is depicted of an apparatus 100 for providing environmental benefits in conjunction with a commercial credit card 110, in accordance with an embodiment of the present invention. The apparatus, such as a server or any other computing device, includes a computing platform 120 having at least one processor 130 and a memory 140. Memory 140 includes an environmental benefit module 150 that is operable to receive commercial credit card purchasing information 160 related to purchases made via the commercial credit card 110. The purchasing information may include, but is not limited to the item/service purchased, type of items/services purchased, the purchase price of the item/service, the date/time of the purchasing transactions and the like.

The environmental benefit module 150 includes an environmental impact routine 170 operable for determining environmental impact data 180 associated with the purchases made via the commercial credit card. In one embodiment, the environmental impact data 180 is related to how previous purchases negatively affect the ecological state of the environment. For example, the environmental impact data 180 may be ecological footprint data or carbon footprint data associated with each of the purchases made via the commercial credit card (or the environmentally significant purchases) or a grouping of purchases made via the commercial credit card. As previously noted, a carbon footprint is a measure of the impact that human activities have on the environment in terms of the amount of greenhouse gases produced, measured in units of carbon dioxide.

The environmental benefit module 150 also includes an environmental advisory routine 190 operable for determining environmental advisory data 200 based on the purchases made via the commercial credit card. In this regard, the environmental advisory routine 190 provides advisory data that is proactive data provided to the commercial entity for the sake of improving or positively affecting the environment and/or future purchasing decisions. Thus, the environmental advisory data 200 may include, but is not limited to, suggestions for environmental improvements, such as alternative purchasing suggestions that provide less in terms of a carbon footprint than presently made purchases. In addition, the environmental advisory data 200 may include environmental education data. In such instances, upon providing the environmental educational data to the commercial entity, the commercial entity may choose to disseminate the educational data to third party supply chain providers, employees or the like.

The memory 140 of apparatus 100 also includes a commercial entity data store 210 operable for storing the environmental impact data 180 and the environmental advisory data 200 in a data file that is associated with the corresponding commercial entity. Once stored, the environmental impact data 180 and the environmental advisory data 200 may be provided to the commercial entity by any known means, such as via conventional mail/package delivery services or electronically.

Referring to FIG. 2, a more detailed block diagram is depicted of an apparatus 100 for providing environmental benefits in conjunction with an environmental benefit commercial credit card 110, in accordance with an embodiment of the present invention. Specifically, FIG. 2 highlights optional and/or alternate embodiments of the present invention.

The apparatus 100 includes computing platform 120 that can receive and execute routines and applications. Computing platform 120 includes memory 140, which may comprise volatile and non-volatile memory, such as read-only and/or random-access memory (RAM and ROM), EPROM, EEPROM, flash cards, or any memory common to computer platforms. Further, memory 140 may include one or more flash memory cells, or may be any secondary or tertiary storage device, such as magnetic media, optical media, tape, or soft or hard disk.

Further, computing platform 120 also includes processor 130, which may be an application-specific integrated circuit ("ASIC"), or other chipset, processor, logic circuit, or other data processing device. Processor 130 or other processor such as ASIC may execute an application programming interface ("API") 132 that interfaces with any resident programs, such as environmental benefit module 150 stored in the memory 140 of the apparatus 100.

Memory 140 includes an environmental benefit module 150 that is operable to receive purchasing commercial credit card information 160 related to purchases made via the commercial credit card 110 (not shown in FIG. 2). Additionally, the environmental benefit module 150 may be optionally operable to receive purchasing data related to purchases from channels other than the commercial credit card. The other channel purchase data may include, but is not limited to, checking/debit account purchase data, cash transaction data, another commercial credit card account and the like. Purchasing data may include items/services purchased and/or leased. As previously noted, configuring the environmental benefit module 150 to receive purchasing data from channels other than the commercial credit card and subsequently using the other purchasing data to determine environmental impact data 180 and environmental advisory data 200 ensures that the overall data is more representative of the commercial entity's entire scope of purchasing.

The environmental benefit module 150 includes an environmental impact routine 170 operable for determining environmental impact data 180 associated with the purchases made via the commercial credit card and, in certain optional embodiments, purchases made via channels other than the commercial credit card. The environmental impact data 180 may be ecological footprint data or carbon footprint data 230 associated with each of the purchases made via the commercial credit card (or the environmentally significant purchases) or a grouping of purchases made via the commercial credit card.

The environmental benefit module 150 also includes an environmental advisory routine 190 operable for determining environmental advisory data 200 based on the purchases made via the commercial credit card and, in certain optional embodiments, purchases made via channels other than the commercial credit card. The environmental advisory data 200 may include, but is not limited to, environmental improvement data 240 that provides suggestions for environmental improvements, such as alternative purchasing suggestions that provide less in terms of a carbon footprint than presently made purchases. In addition, the environmental advisory data 200 may include environmental education data 250.

The environmental benefit module 150 may optionally include environmental rebate routine 260 operable to determine an environmental rebate 270 for the commercial entity based on the amount of purchases made via the commercial credit card. In certain embodiments, the environmental rebate 270 may take the form of carbon offsets 280. In certain embodiments, the environmental rebate routine 260 may include customization data 290 that is operable to customize the environmental rebates based on predefined commercial entity-defined customization attributes, such as customized types of environmental rebates preferred by the commercial entity and/or the region/area in which the commercial entity has defined for use of the environmental rebates (for example, the carbon offsets may apply to a designated state only). In addition, the environmental rebate routine 260 may include rebate proportionment data 292 that is operable to proportion a rebate between environmental rebates and cash rebates based on user predefined rebate proportions. In one specific example, the commercial entity may designate that the ratios change dynamically as the amount of purchasing increases.

The memory 140 of apparatus 100 also includes a commercial entity data store 210 operable for storing the environmental impact data 180 and the environmental advisory data 200 in a data file that is associated with the corresponding commercial entity. Once stored, the environmental impact data 180 and the environmental advisory data 200 may be provided to the commercial entity by any known means, such as via conventional mail/package delivery services or electronically.

Turning the reader's attention to FIG. 3, a bar graph 300 is depicted that illustrates a relationship between environmental benefits offered by a commercial credit card provider and the amount of purchases made on the card, according to embodiments of the present invention. In accordance with present embodiments, the corporate client may be automatically offered the benefits associated with a certain purchasing level based on tracking the purchasing amount associated with the related environmental benefit commercial credit card. At the first purchasing level 310, which is categorized as the lowest purchasing level, the commercial entity may be offered environmental impact data 312, such as carbon footprint data associated with purchases made via the commercial credit card. In this instance, due to the low level of credit card purchases, the commercial entity may not be afforded the option to receive comprehensive environmental impact data that takes into account purchases made through channels other than the commercial credit card.

Additionally, at the first purchasing level 310, the commercial entity may be offered environmental advisory data 314, such as suggested environmental improvement data based on the purchases made via the commercial credit card. For example, if the purchasing data shows a large amount of air travel between two cities, the suggested environmental improvement may be to set up a permanent video conference link between sites in the two cities to minimize the amount of air travel. Similar to the environmental impact data 312 provided at the first purchasing level 310, the environmental advisory data 314 may generally be limited to being based on the commercial card purchases.

The first purchasing level 310 may also include an environmental rebate option 316, such as a carbon offset option. The commercial card provider may set up the rebate program such that the commercial entity's rebate is 100% environmental, or the card provider may allow the commercial entity to choose an appropriate proportion of their rebate to be designated as environmental, while the remainder is in some other rebate form, such as a cash rebate or the like.

Although not shown in FIG. 3 for the sake of brevity, the second purchasing level 320 generally includes all or most of the options/offers described in relation to the first purchasing level 310. Thus, the options/offers shown in FIG. 3 for the second purchasing level 320 are typically in addition to those shown for the first purchasing level 310.

The second purchasing level 320 may include environmental impact data 322, such as carbon footprint data associated with purchases made via the commercial credit card and with purchases made through other purchasing channels, such as debit/checking account purchases, cash purchases or the like. In this instance, the commercial entity may be afforded the option to receive comprehensive environmental impact data 322 that takes into account most, if not all, of the purchases made by the commercial entity. In this regard, the comprehensive environmental impact data 322 may be reflective of the entire environmental impact picture for the commercial entity.

Additionally, the second purchasing level 320 may include environmental advisory data 324, such as suggested environmental improvement data based on the purchases made via the commercial credit card and based on purchases made via channels other than the commercial credit card. In this regard, the environmental advisory data 324 is more comprehensive and provides a better overall indication of where and how the commercial entity may improve environmentally. The second purchasing level 320 may additionally include more environmental advisory data 326 in the form of educational or informative data that is provided to the commercial entity. The educational information may be configured for distribution by the commercial entity to third parties, such as commercial entity employees, supply chain entities, such as suppliers or customers, or the like.

The second purchasing level 320 may also include a customizable environmental rebate option 328, such as a customizable carbon offset option. The customizable nature of the environmental rebate option 328 provides the commercial entity customizable options, such as customizing which type of carbon offsets are designated as their rebate, customizing the region or location of the carbon offset projects or any other feasible environmental rebate options.

Although not shown in FIG. 3 for the sake of brevity, the third purchasing level 330 generally includes all or most of the options/offers described in relation to the first purchasing level 310 and the second purchasing level 320. Thus, the options/offers shown in FIG. 3 for the third purchasing level 330 are typically in addition to those shown for the first purchasing level 310 and the second purchasing level 320.

The third purchasing level 330 may include an option for customized environmental impact data and/or environmental advisory data reports 332. In such embodiments, the commercial entity may choose the type and/or report formatting of the environmental impact data and/or environmental advisory data that they receive. The third purchasing level 330 may also include an option for environmental impact data and/or environmental advisory data warehouse 334 that provides for the commercial card provider to store the commercial entity's environmental impact data and/or environmental advisory data in a database and provide the commercial entity access to the stored data. In certain aspects, websites or other network capabilities may be implemented to provide the commercial entity access to the environmental impact data and/or environmental advisory data warehouse 334.

The third purchasing level 330 may also include an option for environmental rebate sponsorship and/or branding 336, such that environmental rebate projects, such as carbon offset projects, may be sponsored by the commercial entity or provided a branding name to the project as an additional environmental rebate benefit. Additionally, the third purchasing level 330 may also include an option for publicity programs 338 that are implemented on behalf of the commercial entity and serve to promote the environmental initiatives being undertaken by the commercial entity.

Referring to FIG. 4, a block diagram is provided of a system 400 for providing environmental benefits in conjunction with a commercial credit card, according to an embodiment of the present invention. In the system 400, commercial credit card purchase data 402 is communicated to an environmental benefit apparatus 404 that is executed by the commercial card provider or a third party service provider on behalf of the commercial credit card provider. In addition to providing commercial credit card purchase data 402 to the environmental benefit apparatus 404, the commercial entity 406 may provide other channel purchasing data 408, current conservation data 410 and/or non-purchasing related carbon footprint data 412 to the environmental benefit apparatus 404. As previously noted, the other channel purchasing data 408 allows the environmental benefits system to provide a comprehensive picture of the environmental impact and to better tailor environmental advisory data. Current conservation data 410 allows the environmental benefit system 400 to take those conservation efforts into account when determining environmental advisory data. The non-purchasing carbon footprint data 412, for example factory emissions data or the like, allows the environmental benefit system 400 to take into account other environmental impacts that the commercial entity has on the environment other than the purchasing impacts.

Thus, the environmental benefit apparatus 404 includes a carbon footprint determiner 414 or some other environmental impact determiner operable to determine carbon footprints for the commercial entity related to commercial credit card purchases and, optionally, other channel purchases, and, optionally, non-purchasing environmental impacting data. The environmental benefit apparatus 404 may also include a conservation status determiner 416 operable to track, monitor and/or determine the current status of the commercial entity's conservation efforts based on the conservation data provided by the commercial entity or any other data provided by a third party. Additionally, the environmental benefit apparatus 404 may also include an environmental rebate/reward tracking determiner 418 operable to track purchases made via the commercial credit card and apply environmental rebates/rewards, such as carbon offsets or the like, based on the overall amount of credit card purchases.

In addition to the benefits shown in relation to FIG. 3, the environmental benefit apparatus may be configured to provide additional benefits as shown in FIG. 4. These benefits may include, but are not limited to, automated press releases 420 that indicate the commercial entity's current conservation status and the amount/type of carbon offsets made on behalf of the commercial entity. The benefits may also include on-demand reports 422, such that the commercial entity can request environmental impact and/or advisory reports at any point in time to ensure the currency of such data or sustainability reports 426.

The benefits may also include public profile items and/or widgets 424 that may be provided to third parties or executed on commercial entity websites or the like that promote the commercial entity's environmental initiative. Additionally, the benefits may include automatic reporting of environmental impact data 428 to federal agencies or third parties, such as the Chicago Climate Exchange (CCX) or the like. Additionally, the benefits may include environmental data mini-websites 430 associated with the environmental initiatives that allow the commercial entity to incorporate the mini-website in total on their own commercial entity website.

Referring to FIG. 5, a method 400 is illustrated for providing environmental benefits in conjunction with a commercial credit card, according to embodiments of the present invention. At Event 402, first purchasing information associated with purchases made via the commercial credit card is received. At optional Event 404, second purchasing information associated with purchases made via channels other than the commercial credit card is received. As previously noted, the other channels may include any channel, such as a debit/checking account, cash, other commercial credit accounts or the like. The purchasing information may include the product/service purchased, the type of product/service purchased, the amount of the purchases, the date of the purchases and the like.

At Event 406, environmental impact data, such as carbon footprints or the like, are determined based on the received first purchasing data or, optionally, the received first and second purchasing data. The environmental impact data indicates the negative impact on the environment in relation to the purchases made by the commercial entity. At Event 408, environmental advisory data, such as suggestions for environmental improvements, environmental educational data and the like, is determined based on the received first purchasing data or, optionally, the received first and second purchasing data.

At optional Event 410, an environmental rebate, such as carbon offsets or the like, is determined based on the amount of commercial credit card purchases. In certain embodiments, the commercial entity may optionally choose to proportion their rebate between environmental rebates and other rebate types, such as cash rebates. In other embodiments, the environmental rebate may be customizable, such that the commercial entity can designate environmental rebate type and/or specific geographic regions for implementing the carbon offset.

At Event 412, the environmental impact data, the environmental advisory data and, optional environmental rebate are provided to the commercial entity. The environmental impact data, the environmental advisory data and, optional environmental rebate may be provided to the commercial entity electronically or by any other suitable means of communication.

Thus, the embodiments disclosed above provide for a comprehensive environmental benefit program associated with purchases made by a corporate entity and, more specifically, purchases associated with a commercial credit card issued to the corporate entity. The comprehensive environmental benefit program provides for not only rebates/rewards that are environmental-based, such as carbon offsets or the like, but also provides for determining environmental impact data, such as carbon footprint data or the like, associated with each of the purchases and determining environmental advisory data, such as suggestions for environmental improvements, educational information or the like, based on the purchases.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for providing comprehensive environmental data to a commercial entity associated with a commercial credit card, comprising:
   receiving first purchasing information associated with purchases made via the commercial credit card;
   determining, by a computing device processor, environmental impact data related to the purchases;
   determining, by a computing device processor, environmental advisory data based on the purchases that comprises at least one of a suggestion for environmental improvement or environmental education data; and
   providing, by a computing device processor, the environmental impact data and the environmental advisory data to the commercial entity, wherein the environmental impact data is different than the environmental advisory data.

2. The method of claim 1, further comprising receiving second purchasing information associated with purchases made via channels other than the commercial credit card.

3. The method of claim 2, wherein determining environmental impact data further comprises determining, by a computing device processor, environmental impact data based on the purchases made via the commercial credit card and purchases made via channels other than the commercial credit card.

4. The method of claim 2, wherein determining environmental advisory data based on the purchases further comprises determining, by a computing device processor, environmental advisory data based on the purchases made via the commercial credit card and purchases made via channels other than the commercial credit card.

5. The method of claim 1, wherein determining environmental impact data further comprises determining a carbon footprint for one or more of the purchases.

6. The method of claim 1, wherein determining the suggestion for environmental improvement comprises determining, by a computing device processor, a suggestion for an alternative purchase that has less of an environmental impact than one of the purchases made via the commercial credit card.

7. The method of claim 1, further comprising determining, by a computing device processor, an environmental rebate based on an overall amount of the purchases.

8. The method of claim 7, wherein determining the environmental rebate further comprises determining, by a computing device processor, carbon offsets based on the overall amount of the purchases.

9. The method of claim 7, further comprising customizing, by a computing device processor, the carbon offsets based on at least one of corporate entity offset type preference or corporate entity offset geographical region preference.

10. The method of claim 7, further comprising determining, by a computing device processor, carbon offset sponsorship opportunities for the corporate entity based on the overall amount of the purchases.

11. The method of claim 7, wherein determining the environmental rebate further comprises determining, by a computing device processor, the environmental rebate as a portion of an overall rebate based on the commercial entity's choice for portioning the overall rebate between the environmental rebate and a cash rebate.

12. A method for providing comprehensive environmental data to a commercial entity associated with a commercial credit card, comprising:
receiving first purchasing information associated with purchases made via the commercial credit card;
receiving second purchasing information associated with purchases made via channels other than the commercial credit card;
receiving non purchasing carbon footprint data associated with the commercial entity;
determining, by a computing device processor, environmental impact data related to the purchases made via the commercial credit card, the purchases made via channels other than the commercial credit card, and the non-purchasing carbon footprint data; and
providing, by a computing device processor, the environmental impact data to the commercial entity.

13. The method of claim 12, wherein determining environmental impact data further comprises determining, by a computing device processor, a carbon footprint for one or more of the purchases.

14. The method of claim 1, further comprising determining, by a computing device processor, an environmental rebate based on an overall amount of the purchases made via the commercial credit card.

15. The method of claim 14, wherein determining the environmental rebate further comprises determining, by a computing device processor, carbon offsets based on the overall amount of the purchases made via the commercial credit card.

16. The method of claim 15, further comprising customizing, by a computing device processor, the carbon offsets based on at least one of corporate entity offset type preference or corporate entity offset geographical region preference.

17. The method of claim 15, further comprising determining, by a computing device processor, carbon offset sponsorship opportunities for the corporate entity based on the overall amount of the purchases made via the commercial credit card.

18. The method of claim 15, wherein determining the environmental rebate further comprises determining, by a computing device processor, environmental rebates as a portion of an overall rebate based on the commercial entity's choice for portioning the overall rebate between the environmental rebate and a cash rebate.

19. An apparatus for providing comprehensive environmental data to a commercial entity associated with a commercial credit card, comprising:
a computer platform including at least one processor and a memory; and
an environmental benefit module stored in the memory and executable by the processor, wherein the module is operable to receive first purchasing information associated with purchases made via a commercial credit card and includes:
an environmental impact routine operable to determine environmental impact data related to the purchases, and
an environmental advisory routine operable to determine, based on the purchases, environmental advisory data that is different than the environmental impact data and comprises at least one of a suggestion for environmental improvement or environmental education data,
wherein the module is further operable to store the environmental impact data and the environmental advisory in the memory.

20. The apparatus of claim 19, wherein the environmental benefit module is further operable to receive second purchasing information associated with purchases made via channels other than the commercial credit card.

21. The apparatus of claim 20, wherein the environmental impact routine is further operable to determine environmental impact data related to the purchases made via the commercial credit card and purchases made via channels other than the commercial credit card.

22. The apparatus of claim 20, wherein the environmental advisory routine is further operable to determine environmental advisory data based on the purchases made via the commercial credit card and purchases made via channels other than the commercial credit card.

23. The apparatus of claim 19, wherein the environmental impact routine is further operable to determine a carbon footprint for one or more of the purchases.

24. The apparatus of claim 19, wherein the environmental advisory routine is further operable to determine the suggestion for environmental improvement, which comprises a suggestion for an alternative purchase that has less of an environmental impact than one of the purchases made via the commercial credit card.

25. The apparatus of claim 19, wherein the environmental benefit module further includes an environmental rebate routine operable to determine an environmental rebate based on an overall amount of the purchases.

26. The apparatus of claim 25, wherein the environmental rebate routine is further operable to determine carbon offsets based on the overall amount of the purchases.

27. The apparatus of claim 25, wherein the environmental rebate routine is further operable to customize the carbon offsets based on at least one of corporate entity offset type preference or corporate entity offset geographical region preference.

28. The apparatus of claim 25, wherein the environmental rebate routine is further operable to determine carbon offset sponsorship opportunities for the corporate entity based on the overall amount of the purchases.

29. The apparatus of claim 25, wherein the environmental rebate routine is further operable to determine environmental rebates as a portion of an overall rebate based on the commercial entity's choice for portioning the overall rebate between the environmental rebate and a cash rebate.

30. An apparatus for providing comprehensive environmental data to a commercial entity associated with a commercial credit card, comprising:
a computer platform including at least one processor and a memory; and
an environmental benefit module stored in the memory and executable by the processor, wherein the module is operable to receive first purchasing information associated with purchases made via a commercial credit card, second purchasing information associated with purchases made via channels other than the commercial credit card, and non-purchasing carbon footprint data associated with the commercial entity and includes:

an environmental impact routine operable to determine environmental impact data related to the purchases made via a commercial credit card purchases made via channels other than the commercial credit card, and the non-purchasing carbon footprint data, wherein the module is further operable to store the environmental impact data in the memory.

31. The apparatus of claim 30, wherein the environmental impact routine is further operable to determine a carbon footprint for one or more of the purchases.

32. The apparatus of claim 30, wherein the environmental benefit module further includes an environmental rebate routine operable to determine an environmental rebate based on an overall amount of the purchases.

33. The apparatus of claim 32, wherein the environmental rebate routine is further operable to determine carbon offsets based on the overall amount of the purchases.

34. The apparatus of claim 33, wherein the environmental rebate routine is further operable to customize the carbon offsets based on at least one of corporate entity offset type preference or corporate entity offset geographical region preference.

35. The apparatus of claim 33, wherein the environmental rebate routine is further operable to determine carbon offset sponsorship opportunities for the corporate entity based on the overall amount of the purchases.

36. The apparatus of claim 33, wherein the environmental rebate routine is further operable to determine environmental rebates as a portion of an overall rebate based on the commercial entity's choice for portioning the overall rebate between the environmental rebate and a cash rebate.

37. A computer program product, comprising:
a computer-readable medium comprising:
a first set of codes for causing a computer to receive first purchasing information associated with purchases made via the commercial credit card;
a second set of codes for causing the computer to determine environmental impact data related to the purchases;
a third set of codes for causing the computer to determine, based on the purchases, environmental advisory data that comprises at least one of a suggestion for environmental improvement or environmental education data; and
a fourth set of codes for causing the computer to store the environmental impact data and the environmental advisory data in a file associated with the commercial entity, wherein the environmental impact data is different than the environmental advisory data.

38. The computer program product of claim 37, wherein the first set of codes is further operable to cause the computer to receive second purchasing information associated with purchases made via channels other than the commercial credit card.

39. The computer program product of claim 38, wherein the second set of codes is further operable to cause the computer to determine environmental impact data based on the purchases made via the commercial credit card and purchases made via channels other than the commercial credit card.

40. The computer program product of claim 38, wherein the third set of codes is further operable to cause the computer to determine environmental advisory data based on the purchases made via the commercial credit card and purchases made via channels other than the commercial credit card.

41. The computer program product of claim 37, wherein the second set of codes is further operable to cause the computer to determine a carbon footprint for each of the purchases.

42. The computer program product of claim 37, wherein the third set of codes is further operable to cause the computer to determine, based on the purchases, the suggestion for environmental improvement, which comprises a suggestion for an alternative purchase that has less of an environmental impact than one of the purchases made via the commercial credit card.

43. The computer program product of claim 37, further comprising a fifth set of codes to cause the computer to determine an environmental rebate based on an overall amount of the purchases.

44. The computer program product of claim 43, wherein the fifth set of codes is further operable to cause the computer to determine carbon offsets based on the overall amount of the purchases.

45. The computer program product of claim 43, wherein the fifth set of codes is further operable to cause the computer to customize the carbon offsets based on at least one of corporate entity offset type preference or corporate entity offset geographical region preference.

46. The computer program product of claim 43, wherein the fifth set of codes is further operable to cause the computer to determine carbon offset sponsorship opportunities for the corporate entity based on the overall amount of the purchases.

47. The computer program product of claim 43, wherein the fifth set of codes is further operable to cause the computer to determine environmental rebates as a portion of an overall rebate based on the commercial entity's choice for proportioning the overall rebate between the environmental rebate and a cash rebate.

48. The computer program product of claim 37, wherein the third set of codes is further operable to determine, based on the purchases, the environmental education data that the commercial entity can distribute to supply chain entities or commercial entity employees.

* * * * *